(12) United States Patent
Ontl et al.

(10) Patent No.: US 10,369,686 B2
(45) Date of Patent: Aug. 6, 2019

(54) HAND-HELD POWER TOOL AND CONTROL METHOD THEREFOR

(71) Applicant: Hilti Aktiengesellschaft, Schaan (LI)

(72) Inventors: Rainer Ontl, Landsberg am Lech (DE); Frank Kohlschmied, Munich (DE); Christoph Dieing, Isny (DE)

(73) Assignee: Hilti Aktiengesellschaft, Schaan (LI)

( * ) Notice: Subject to any disclaimer, the term of this patent is extended or adjusted under 35 U.S.C. 154(b) by 217 days.

(21) Appl. No.: 15/532,632

(22) PCT Filed: Dec. 1, 2015

(86) PCT No.: PCT/EP2015/078137
§ 371 (c)(1),
(2) Date: Jun. 2, 2017

(87) PCT Pub. No.: WO2016/087405
PCT Pub. Date: Jun. 9, 2016

(65) Prior Publication Data
US 2018/0001462 A1    Jan. 4, 2018

(30) Foreign Application Priority Data

Dec. 3, 2014    (EP) .................................... 14196017

(51) Int. Cl.
*B25D 17/24*    (2006.01)
*B25D 11/12*    (2006.01)
(Continued)

(52) U.S. Cl.
CPC ............ *B25D 17/24* (2013.01); *B25D 11/125* (2013.01); *B25D 16/00* (2013.01); *F16F 7/104* (2013.01);
(Continued)

(58) Field of Classification Search
CPC ...... B25D 17/043; B25D 17/06; B25D 17/24; B25D 11/00; B25D 11/10; B25D 11/005;
(Continued)

(56) References Cited

U.S. PATENT DOCUMENTS 4,014,392 A * 3/1977 Ross .................... B25D 11/125
173/117
4,282,938 A * 8/1981 Minamidate ......... B25D 17/043
173/162.2
(Continued)

FOREIGN PATENT DOCUMENTS

CN        1637314 A    7/2005
CN        1762667 A    4/2006
(Continued)

*Primary Examiner* — Scott A Smith
(74) *Attorney, Agent, or Firm* — Davidson, Davidson & Kappel, LLC

(57) ABSTRACT

A hand-held power tool has a tool holder for holding a tool along a working axis. A hammer mechanism has a striker that is moved periodically at an impact rate along the working axis between a turning point in the proximity of the tool and a turning point remote from the tool. A drive control of the hammer mechanism sets the impact rate to a set point value. A vibration absorber has an oscillator that moves along the working axis about a resting position and one or multiple springs that drive the oscillator back into the resting position. A first sensor is used to determine a phase of the motion of the striker. A sensor is used to determine a first phase of a compression point of the hammer mechanism. Another sensor is used to determine a second phase of a turning point in the proximity of the tool, of the hammer mechanism. A damping controller adapts the set point value in such a way that a phase difference between the first phase and the second phase is less than a threshold value.

4 Claims, 2 Drawing Sheets

(51) Int. Cl.
*F16F 7/104* (2006.01)
*B25D 16/00* (2006.01)
*F16F 7/10* (2006.01)

(52) U.S. Cl.
CPC *B25D 2211/068* (2013.01); *B25D 2217/0092* (2013.01); *B25D 2250/005* (2013.01); *B25D 2250/175* (2013.01); *B25D 2250/201* (2013.01); *B25D 2250/221* (2013.01); *F16F 7/1005* (2013.01)

(58) Field of Classification Search
CPC ............. B25D 11/125; B25D 16/006; B25D 2250/005; B25D 2250/175; B25D 2250/201; B25D 2250/221; B25D 2211/068; B25D 2217/0076; B25D 2217/0092; F16F 7/104; F16F 7/108; F16F 7/1005; F16F 7/116; F16F 15/22; B25F 5/006
USPC ..... 173/1, 109, 201, 162.1, 162.2, 210, 211, 173/2, 170, 217
See application file for complete search history.

(56) References Cited

U.S. PATENT DOCUMENTS

| | | | | |
|---|---|---|---|---|
| 7,204,322 B2* | 4/2007 | Sakai | ............... | B25D 11/125 173/117 |
| 7,383,895 B2* | 6/2008 | Aoki | ............... | B25D 16/00 173/109 |
| 7,451,833 B2* | 11/2008 | Hahn | ............... | B25D 17/24 173/104 |
| 7,588,097 B2* | 9/2009 | Kamegai | ............... | B25D 11/062 173/109 |
| 7,604,071 B2* | 10/2009 | Ikuta | ............... | B25D 17/24 173/122 |
| 7,766,096 B2* | 8/2010 | Satou | ............... | B25D 17/24 173/109 |
| 7,806,201 B2* | 10/2010 | Aoki | ............... | B23D 51/16 173/162.2 |
| 8,434,565 B2 | 5/2013 | Hecht et al. | | |
| 2006/0086515 A1 | 4/2006 | Engelfrid | | |
| 2008/0179152 A1 | 7/2008 | Moessnang | | |
| 2009/0218114 A1* | 9/2009 | Ohlendorf | ............... | B23D 51/00 173/211 |
| 2010/0224383 A1* | 9/2010 | John | ............... | B25D 11/125 173/201 |
| 2010/0236801 A1* | 9/2010 | Furusawa | ............... | B25D 11/10 173/47 |
| 2011/0024149 A1* | 2/2011 | Hecht | ............... | B25D 17/24 173/162.2 |
| 2011/0155405 A1 | 6/2011 | Aoki | | |
| 2011/0303429 A1* | 12/2011 | Kohlschmied | ....... | B25D 11/005 173/112 |
| 2012/0279741 A1 | 11/2012 | Schlesak et al. | | |
| 2013/0284473 A1 | 10/2013 | Hartmann et al. | | |
| 2015/0367492 A1* | 12/2015 | Lindell | ............... | B25D 17/24 173/211 |

FOREIGN PATENT DOCUMENTS

| | | |
|---|---|---|
| CN | 101235871 A | 8/2008 |
| CN | 101941199 A | 1/2011 |
| CN | 102066056 A | 5/2011 |
| CN | 103831800 A | 6/2014 |
| DE | 102012221517 | 5/2014 |
| EP | 2189249 | 5/2010 |
| GB | 2409835 B | 3/2006 |
| JP | H01274972 A | 11/1989 |

\* cited by examiner

US 10,369,686 B2

HAND-HELD POWER TOOL AND CONTROL METHOD THEREFOR

TECHNICAL FIELD OF THE INVENTION

The present invention relates to a control method for a hand-held power tool including a vibration absorber for damping periodic vibrations.

U.S. Pat. No. 8,434,565 B2 describes a hammer drill whose hammer mechanism drives a bit at an impact frequency into a substrate. The vibrations which occur at the impact frequency are damped by a vibration absorber. The vibration absorber includes a freely suspended oscillator which is capable of oscillating back and forth out of a resting position along the impact direction. Springs drive the oscillator back into the resting position after a deflection. The mass of the oscillator and the resilience of the springs are adapted to the impact frequency.

SUMMARY OF THE INVENTION

The hand-held power tool according to the present invention includes a tool holder for holding a tool on a working axis. A hammer mechanism includes a striker which is moved periodically at an impact rate on the working axis between a turning point which is close to the tool and a turning point which is far away from the tool. A drive control of the hammer mechanism sets the impact rate to a setpoint value. A vibration absorber includes an oscillator which is movable along the working axis about a resting position and one or multiple spring(s) which drive(s) the oscillator back into the resting position. A sensor is used to ascertain a first phase of a compression point of the hammer mechanism. Another sensor is used to ascertain a second phase of a turning point of the vibration absorber which is close to the tool. A damping controller adapts the setpoint value in such a way that a phase difference between the first phase and the second phase is less than a threshold value. The phases are the periodically returning points in time at which the hammer mechanism is maximally compressed at a compression point or the vibration absorber is at the turning point which is close to the tool.

BRIEF DESCRIPTION OF THE DRAWINGS

The following description elucidates the present invention based on exemplary specific embodiments and the drawings.

In the figures, elements which are identical or have identical functions are identified with identical reference numerals, unless otherwise indicated.

DETAILED DESCRIPTION

Figure 1:
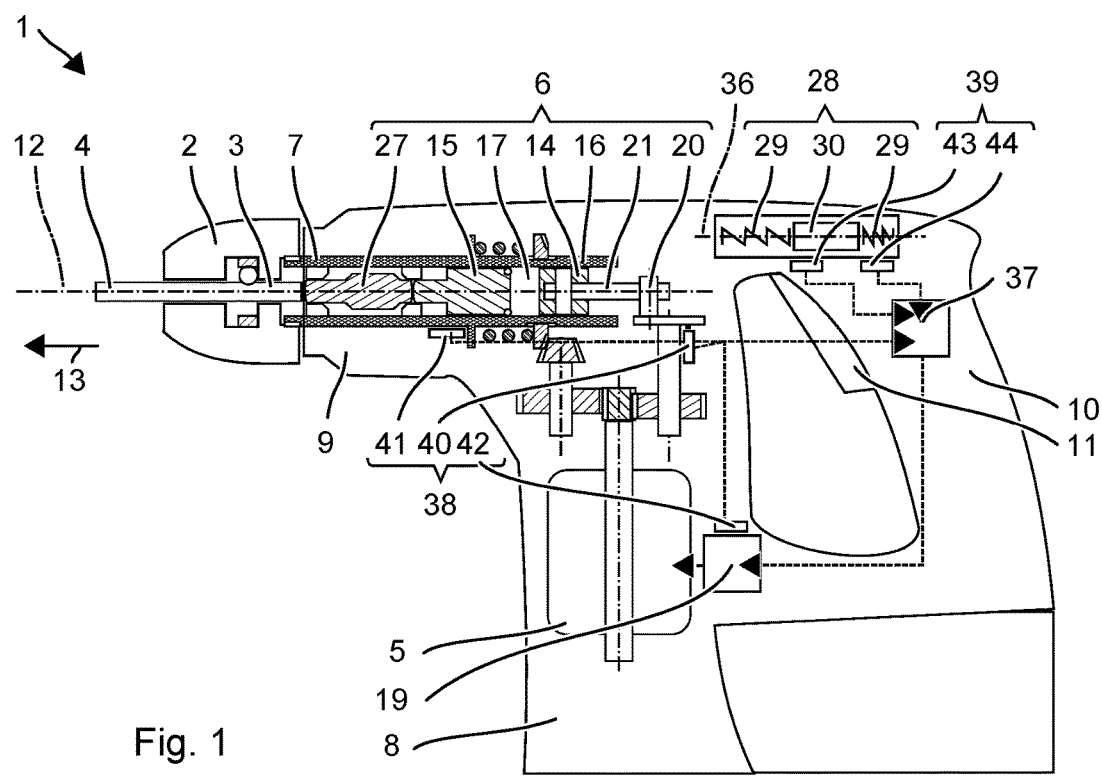
FIG. 1 shows a hammer drill.

FIG. 1 schematically shows a hammer drill 1 as an example of a hand-held power tool. Hammer drill 1 includes a tool holder 2 into which a shaft end 3 of a tool, for example of a drill bit 4, may be inserted. In the case of a primary drive, hammer drill 1 is driven by a motor 5 which drives a hammer mechanism 6 and an output shaft 7. A battery pack 8 or a mains line supplies motor 5 with power. Pneumatic hammer mechanism 6 and preferably the other driving components are situated within a machine housing 9. A user may guide hammer drill 1 with the aid of a handle 10 which is fastened to machine housing 9. Motor 5 and thus hammer drill 1 may be started up with the aid of a system switch 11. During operation, hammer drill 1 continuously rotates drill bit 4 about a working axis 12 and is capable of driving drill bit 4 into a substrate in impact direction 13 along working axis 12.

Figure 2:
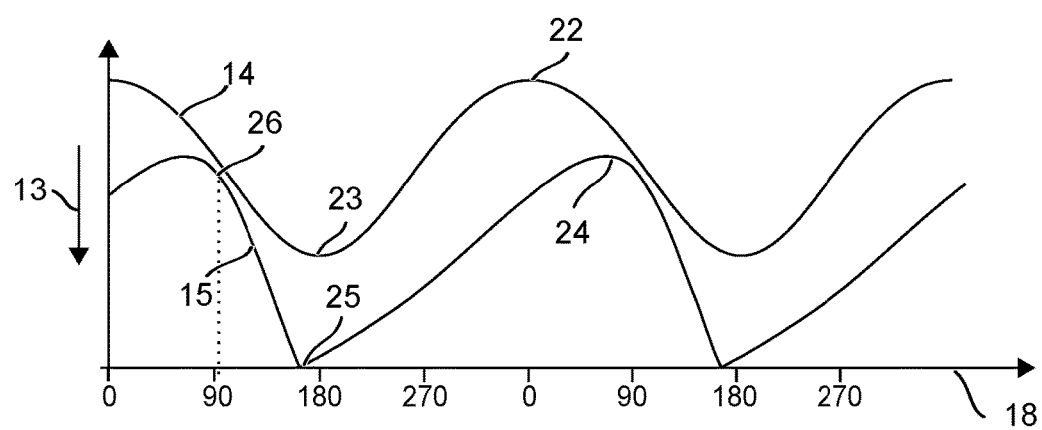
FIG. 2 shows the cyclic movement of a pneumatic hammer mechanism.

Pneumatic hammer mechanism 6 includes an exciter 14 and a striker 15 which are movably guided in a guiding tube 16 along working axis 12. Exciter 14 and striker 15 enclose a pneumatic chamber 17 in-between each other. Exciter 14 is periodically moved back and forth on working axis 12 by motor 5. Pneumatic chamber 17 forms a pneumatic spring which connects striker 15 to the movement of exciter 14. FIG. 2 schematically shows the periodic movements of exciter 14 and striker 15 over time and phase 18. The cycle duration is predefined by the forced movement of exciter 14. A motor controller 19 sets the rotational speed of motor 5 to a setpoint value. The rotational speed predefines the cycle duration. The setpoint value of the rotational speed is configured to provide for an efficient pneumatic coupling of striker 15 to exciter 14. The impact rate of hammer mechanism 6 is inverse to the cycle duration and is typically in the range between 10 Hz and 100 Hz.

The rotational movement of motor 5 is transferred via a transmission unit 20 into the linear movement for exciter 14. For example, the transmission unit includes an eccentric wheel 20 and a piston rod 21 which connect motor 5 to exciter 14. Transmission unit 20 may also be based on a wobble ring. For the most part, the linear movement of exciter 14 is harmonious or sinusoidal having the fixed cycle duration. Exciter 14 oscillates between a top dead center remote from the tool and a top dead center 23 which is close to the tool.

Exciter 14 and striker 15 are designed as pistons and close pneumatic chamber 17 in-between each other. Striker 15 oscillates along working axis 12 between two turning points 24, 25. Turning point 24 which is remote from the tool is shortly followed by compression point 26 at which exciter 14 and striker 15 maximally compress pneumatic chamber 17. Compression point 26 may follow top dead center 22 of exciter 14, which is remote from the tool, between 95 degrees and 110 degrees. In turning point 25 (point of impact) which is close to the tool, striker 15 impacts drill bit 4 or anvil 27. The movement of striker 15 is strongly anharmonic, in particular in point of impact 25. The energy transfer from exciter 14 to striker 15 takes place only via pneumatic chamber 17. For the purpose of an efficient energy transfer, the cycle duration of exciter 14 to the other parameters of the hammer mechanism, such as the mass of striker 15, or the volume of pneumatic chamber 17, is coordinated in tight limits.

The periodic movements of exciter 14 and striker 15 imprint vibrations into machine housing 9 which are transferred to handle 10. The user in particular feels the acceleration of striker 15 at compression point 26.

Figure 3:
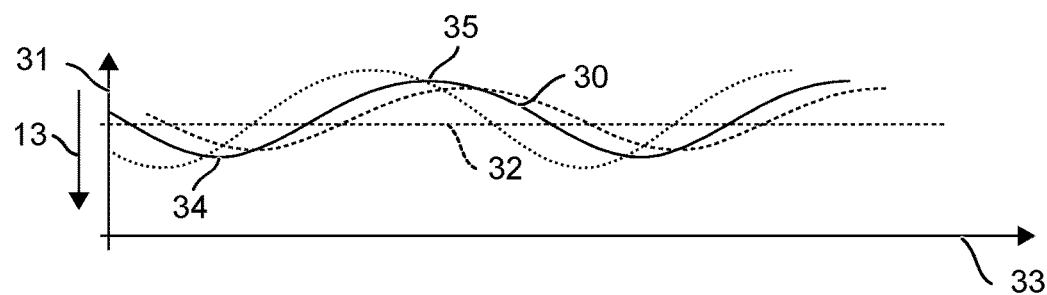
FIG. 3 shows the cyclic movement of an excited vibration absorber.

A vibration absorber 28 in machine housing 9 reduces the amplitude of the vibrations. Vibration absorber 28 includes an oscillator 30 which is suspended on one or multiple spring(s) 29. The inertia of oscillator 30 effectuates a relative movement of oscillator 30 in relation to vibrating machine housing 9. The periodic vibrations of hammer mechanism 6 along working axis 12 result in a periodic deflection 31 of oscillator 30 in relation to a resting position 32 in machine housing 9. Only springs 29 connect oscillator 30 to machine housing 9 and exert a restoring force into resting position 32 on oscillator 30 in the case of a deflection 31. Excited periodic deflection 31 of oscillator 30 is illustrated in FIG. 3 over time and phase 33 of the movement. Oscillator 30 oscillates between a turning point 34 which is close to the tool and a turning point 35 which is remote from the tool. The periodicity is equal to the impact frequency of the periodic excitation. The amplitude of deflection 31 is a function of the amplitude of the vibrations and the impact frequency.

Exemplary vibration absorber 28 includes an oscillator 30 which is guided in a linear bearing along an axis 36. Axis 36 is parallel to or inclined by less than 30 degrees in relation to working axis 12. Springs 29 are, for example, coil springs with the aid of which oscillator 30 is supported along axis 36 on machine housing 9. An alternative vibration absorber 28 includes an oscillator which is guided on a curved pathway. The oscillator is suspended on machine housing 9 via an oscillating arm. The oscillating arm is a flexible spring which is situated perpendicularly to the working axis.

Oscillating vibration absorber 28 effectuates a reduction of the vibrations transferred to handle 10. The reduction does not take place through a dissipative effect of vibration absorber 28. Vibration absorber 28, together with hammer mechanism 6, rather forms a contiguous oscillating system, having a nodal point of vibration. The system is coordinated in such a way that the connecting point of the system to machine housing 9 and handle 10 coincides with the nodal point of vibration. The optimal reduction is achieved when the impact frequency is equal to the natural frequency of vibration absorber 28. The natural frequency is the frequency at which vibration absorber 28 oscillates after being deflected once without further excitation. The natural frequency is predefined by the mass of oscillator 30 and the stiffness of springs 29.

Vibration absorber 28 includes a damping controller 37 which modifies the rotational speed of motor 5 for the purpose of optimizing the vibration reduction by vibration absorber 28. Damping controller 37 detects phase 18 of the movement of hammer mechanism 6 with the aid of a first (hammer mechanism) sensor 38 and phase 33 of the movement of oscillator 30 with the aid of a second (vibration absorber) sensor 39. Damping controller 37 uses the difference of phases 18, 33 to ascertain an actuating signal which modifies the setpoint value for the rotational speed of motor 5. The setpoint value is adapted in such a way that compression point 26 of hammer mechanism 6 and turning point 34 of vibration absorber 28 which is close to the tool coincide timewise. For example, the rotational speed is increased when striker 15 reaches compression point 26 too late, and correspondingly, the rotational speed is reduced when striker 15 reaches compression point 26 too soon.

The movements of transmission unit 20, exciter piston 14, and striker 15 are coupled to one another in a manner known per se, for example as illustrated in FIG. 2. The position and the movement direction of one of the moving components of hammer mechanism 6 may be directly inferred from the position and the movement direction of the other moving components. For example, the direct determination of phase 33 of compression point 26 may be unsuitable. The phase difference between compression point 26 and top dead center 22 of exciter 14 remote from the tool, which may be between 95 degrees and 110 degrees, for example, is known from the design of hammer mechanism 6 or it is empirically ascertained.

Hammer mechanism sensor 38 may, for example, detect the angle position of eccentric wheel 20. Eccentric wheel 20 may be provided with a magnet which passes hammer mechanism sensor 38, which is designed as a Hall sensor 40, once every rotation. Hall sensor 40 generates a switching pulse when passing the magnet. The switching pulse synchronizes a detunable oscillator to the rotational speed of eccentric wheel 20, e.g., using a phase-locked loop. The frequency of the oscillator is, for example, in the range between 50 times and 200 times the impact rate. The oscillator has, for example, a frequency which is 72 times the rotational speed for the purpose of breaking up the phase of eccentric wheel 20 and thus the phase of hammer mechanism 6 into 5 degrees increments. The magnet and the Hall sensor are examples of various known, preferably contactless, sensors which may be used to detect the angle position of eccentric wheel 20.

Hammer mechanism sensor 38 may, for example, detect a certain position of striker 15, e.g., that striker 15 is in the point of impact. For example, hammer mechanism sensor 38 includes a solenoid coil 41 through which current flows and which is situated at guiding tube 16, e.g., close to the point of impact. The current flow in solenoid coil 41 changes when steel striker 15 dips into solenoid coil 41. The generated current pulse is supplied to the oscillator for the purpose of breaking up the phase into smaller steps. Instead of inductive sensor 41, other contactless sensors may also be used. Alternatively, contact sensors may also be used which are mechanically actuated by striker 15. A certain position of exciter 14 may also be ascertained via contactless sensors and the phase of hammer mechanism 6 may be derived therefrom.

Hammer mechanism sensor 38 may include an acceleration sensor 42 or an acoustic sensor. Acceleration sensor 42 detects the accelerations of hammer mechanism 6 or of machine housing 9. The accelerations occur during ongoing operation, in particular in the compression point when exciter 14 accelerates striker 15 in impact direction 13. The acoustic sensor detects the impact of striker 15 on anvil 27 or the tool. The corresponding signals of sensors 42 may be supplied to the oscillator for the purpose of breaking up the phase into smaller steps. Sensors 42 may be advantageously integrated, e.g., into motor controller 19, remotely from hammer mechanism 6 and eccentric wheel 20.

Vibration absorber sensor 39 detects, for example, a certain position of oscillator 30, e.g., that oscillator 30 is passing through the resting position. Oscillator 30 may be provided with a magnet, and vibration absorber sensor 39 includes a Hall sensor 43, for example. A detunable oscillator which synchronizes the signals of Hall sensor 43 is connected downstream from Hall sensor 43. The frequency of the oscillator is preferably in the range between 50 times and 200 times the impact rate in order to determine the phase of vibration absorber 28 at a higher resolution.

Vibration absorber sensor 39 may, for example, detect deflection 31 of oscillator 30. Deflection 31 may, for example, be ascertained with the aid of a spatial resolution Hall sensor 44. The oscillator may, for example, be synchronized toward reaching the turning points of the movement in order to ascertain the phase. Vibration absorber sensor 39 may also detect the velocity of oscillator 30, e.g., with the aid of an inductive sensor. Vibration absorber sensor 39 may reference the phase toward reaching the maximum velocity, i.e., the passage of resting position 32, or the drop of the velocity to zero, i.e., in the turning points.

Hammer mechanism sensor 38 transmits phase 18 of hammer mechanism 6 and vibration absorber sensor 39 transmits phase 33 of vibration absorber 28 to damping controller 37. The oscillation rate of vibration absorber 28 is equal to the impact rate due to the excitation of oscillator 30 by hammer mechanism 6. Phase 18 of hammer mechanism 6 in relation to phase 33 of vibration absorber 28 is a function of the difference between the impact rate and the natural frequency of vibration absorber 28, among other things. Damping controller 37 generates an actuating signal from the difference between phases 18, 33. The actuating signal is supplied to motor controller 19 which modifies the setpoint value for the rotational speed in response to the actuating signal. The setpoint value is increased when phase 33 of vibration absorber 28 is ahead of the phase of hammer mechanism 6. The setpoint value is adapted in such a way that the phase difference falls below a threshold value. Load changes, in particular during drilling, result in temporary rotational speed oscillations of motor 5 until motor 5 reaches the setpoint value again. The threshold value may be selected correspondingly and is, for example, at 30 degrees. The setpoint value is preferably varied only in one window. The window is between 95% and 105% of a rotational speed which is designed for the optimal operation of hammer mechanism 6. Damping controller 37 may emit an error signal when the phase difference is not correctable to zero.

Motor controller 19 suppresses the actuating signal of damping controller 37 when hammer mechanism 6 is inactive in the case of a rotating motor 5. Hammer mechanism 6 is, for example, deactivated when a contact pressure of drill bit 4 is missing. Striker 15 may move beyond point of impact 25. In this case, ventilation openings are opened which allow for an air exchange between pneumatic chamber 17 and the surroundings. The connection between striker 15 and exciter 14 breaks down and striker 15 rests despite exciter 14 moving back and forth. A detection of inactive hammer mechanism 6 may, for example, be determined by the decreasing power consumption of motor 5. Alternative methods determine a drop in vibrations or in the noise level of hammer drill 1. Or the movement of striker 15 or a position of striker 15 is directly monitored.

What is claimed is:

1. A hand-held power tool comprising:
    a tool holder for holding a tool on a working axis;
    a hammer mechanism including a striker moved periodically at an impact rate on the working axis between a turning point close to the tool and a turning point remote from the tool;
    a drive control of the hammer mechanism setting the impact rate to a setpoint value;
    a vibration absorber including an oscillator movable along the working axis about a resting position and at least one spring driving the oscillator back into the resting position;
    at least one sensor for ascertaining a first phase of a compression point of the hammer mechanism;
    the at least one sensor for ascertaining a second phase of a turning point of the vibration absorber close to the tool; and
    a damping controller adapting the setpoint value in such a way that a phase difference between the first phase and the second phase is less than a threshold value.

2. The hand-held power tool as recited in claim 1 further comprising an RPM-controlled motor driving the hammer mechanism.

3. A control method for a hand-held power tool as recited in claim 1, comprising the following steps:
    ascertaining the first phase of the compression point of the hammer mechanism;
    ascertaining the second phase of a turning point of the vibration absorber close to the tool; and
    adapting the setpoint value of the impact rate in such a way that the phase difference between the first phase and the second phase is less than the threshold value.

4. The control method as recited in claim 3 wherein the setpoint value is increased when the first phase lags behind the second phase, and the setpoint value is reduced when the first phase is ahead of the second phase.

* * * * *